United States Patent [19]

Kinoshita et al.

[11] Patent Number: 5,113,426
[45] Date of Patent: May 12, 1992

[54] GROUND FAULT DETECTOR

[75] Inventors: Kazumi Kinoshita; Kenji Takato, both of Kawasaki; Toshiro Tojo, Machida, all of Japan

[73] Assignee: Fujitsu Limited, Kawasaki, Japan

[21] Appl. No.: 573,130

[22] PCT Filed: Jan. 12, 1990

[86] PCT No.: PCT/JP90/00036
§ 371 Date: Sep. 19, 1990
§ 102(e) Date: Sep. 19, 1990

[87] PCT Pub. No.: WO90/08441
PCT Pub. Date: Jul. 26, 1990

[30] Foreign Application Priority Data
Jan. 19, 1989 [JP] Japan .................................. 1-12612

[51] Int. Cl.$^5$ ..................... H04M 3/22; H04M 19/00
[52] U.S. Cl. ........................................ 379/33; 379/26; 379/324; 379/412; 379/413
[58] Field of Search ............... 379/26, 32, 33, 27, 379/29, 324, 412, 413

[56] References Cited

U.S. PATENT DOCUMENTS

| 4,748,652 | 5/1988 | Nagai et al. ........................... 379/26 |
| 4,897,872 | 1/1990 | Siligoni et al. ....................... 379/412 |

FOREIGN PATENT DOCUMENTS

| 57-109017 | 7/1982 | Japan . |
| 58-48559 | 3/1983 | Japan . |
| 0193444 | 7/1990 | Japan ..................................... 379/32 |

*Primary Examiner*—Stafford D. Schreyer
*Attorney, Agent, or Firm*—Staas & Halsey

[57] ABSTRACT

In a ground fault detector for long distance subscriber lines accommodated in a small capacity digital electronic exchange, a DC/DC converter for power supply is stopped during detection of ground fault. Upon reception of the stop signal, the DC/DC converter converts the power supply voltage for the subscribers to a voltage as the system power supply of the exchange, namely to a low voltage before voltage conversion of the DC/DC converter. The battery feed circuit can maintain the alarm condition, even if a current flows continuously to the battery feed resistor due to a ground fault, until the ground fault is recovered by the maintenance person without breaking the resistor.

6 Claims, 2 Drawing Sheets

GROUND FAULT DETECTOR

FIELD OF THE INVENTION

The present invention relates to a ground fault detector for long distance subscriber circuits accommodated in a small capacity digital electronic exchange (private branch exchange) and particularly to a ground fault detector having a function to protect the long distance subscriber circuit by stoppage of DC/DC converter when a ground fault occurs in the subscriber line.

The subscriber circuit to be used for the digital electronic exchange is required to provide a so-called BORSCHT function covering the battery feed (B), overvoltage protection (O), ringing (R), supervisory (S), CODEC (C), hybrid (H) and testing (T), but the present invention relates to a circuit for realizing ground fault detection which is the one of the supervisory function (S).

A ground fault is usually generated when the telephone line not insulated is erroneously in contact with the grounded metal or the ground during the construction. If the ground fault is generated, a current of the battery feed circuit is doubled and requires the power of four times that of the ordinary one, resulting in dangerous condition such as heat generation.

On the other hand, a large capacity digital electronic exchange (office exchange) generally feeds the power to the subscriber lines using a battery of −48V but a small capacity digital electronic exchange (PBX) generally feeds the power using a battery of −24V because the telephone line connecting the exchange and telephone set is comparatively short. However, if the telephone line becomes longer, the battery of −24V cannot supply sufficient speech current and therefore a higher voltage, for example, −48V is necessary for the long distance subscriber lines. In order to obtain such higher negative voltage, the −24V voltage is boosted up to −48V by utilizing a DC/DC converter into the battery feed circuit for the subscriber lines. Since the long distance subscriber lines are placed under severe circuit conditions, the battery feed circuit formed by resistors and transformers provides some advantages.

The advantages of power feeding by resistors includes that dynamic range which is required for the battery circuit by transistors is no longer necessary to be considered and a current can be supplied in bothways without distortion. Namely, a method of protection circuit through constant current which is often used in the battery feed circuit by the transistor circuit is difficult to be used in the battery feed circuit for the long distance subscriber lines.

BACKGROUND

A circuit structure of conventional ground fault detector for subscriber circuits utilizing a DC/DC converter into the battery feed circuit is shown in FIG. 1. In FIG. 1, the reference numeral 1 designates a DC/DC converter; 2, a comparator; 3, transformer for power feeding; 4, a subscriber telephone set.

A DC/DC converter 1 is a DC voltage converting circuit for boosting −24V voltage (system power supply of exchange) up to −48V and a comparator 2 is a circuit for detecting ground fault through comparison of voltage with the reference voltage and sends a supervisory signal to the controller of exchange. If a ground fault is generated on the subscriber lines, a battery feed current I is doubled in case the line resistance is zero. Accordingly, in case a voltage of DC/DC converter 1 is fixed to −48V, a battery current increases. Moreover, the ground fault detection voltage $V_E$ becomes the ground potential, the comparator 2 is inverted, thereby the signal "1" is sent to the exchange controller and an alarm is issued. Even if a ground fault occurs, the battery feed of −48V still supplies −48V continuously, the DC/DC converter 1 requires the battery feed resistors $R_T$ and $R_R$ which are resistive to four times of power dissipation and is also required to have a structure which is resistive to the doubled current. As a result, the DC/DC converter 1 results in not only rise of cost but also increase in size of circuit elements and restriction on mounting of elements.

SUMMARY OF THE INVENTION

Therefore, it is a principal object of the present invention to provide a ground fault detector which has solved problems mentioned above.

In more specifically, it is an object of the present invention to provide a ground fault detector which has realized reduction in size of circuit elements, light weight and economization by maintaining the ground fault detecting condition to lower the current capacity during ground fault by converting voltage of −48V to −24V when the ground fault is detected in the case of supplying the voltage of −48V to the battery feed circuit for the long distance subscriber lines using a DC/DC converter.

The present invention discloses a ground fault detector for long distance subscriber lines accommodated in a small capacity digital electronic exchange (private branch exchange). The ground fault detector also comprises following elements.

The ground fault detector comprises a DC/DC converter for converting a low voltage to a high voltage as the power supply voltage and a comparator for detecting generation of ground fault. This comparator compares the reference voltage obtained by dividing the high voltage converted by the DC/DC converter with the ground fault detection voltage to detect generation of ground fault, sends a ground fault supervisory signal to the exchange controller upon detection of ground fault and sends the stop signal to stop the operation of DC/DC converter thereto.

DESCRIPTION OF THE PREFERRED EMBODIMENT

The basic structure of the present invention will be explained with reference to FIG. 2.

Figure 1:
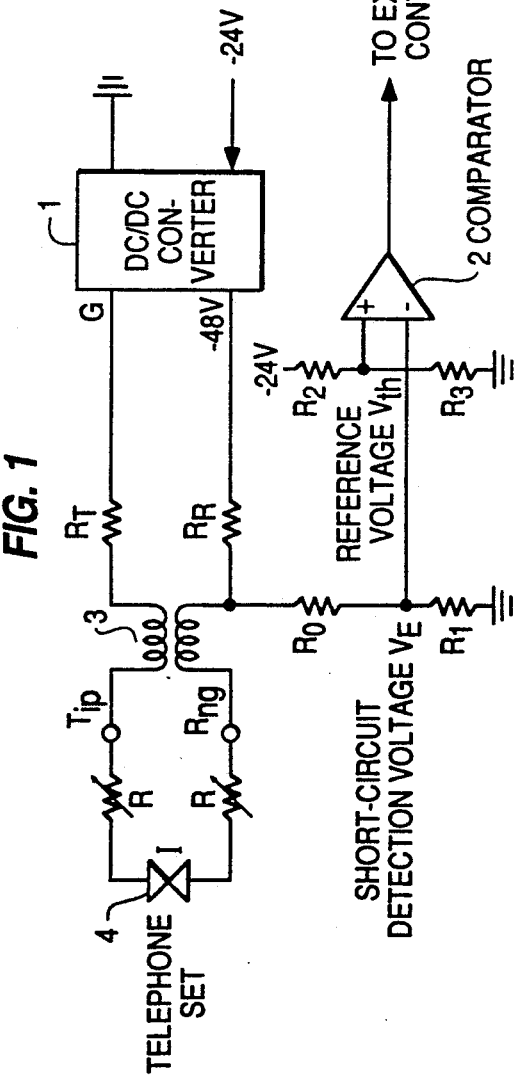
FIG. 1 is a conventional ground fault detection circuit.
Figure 2:
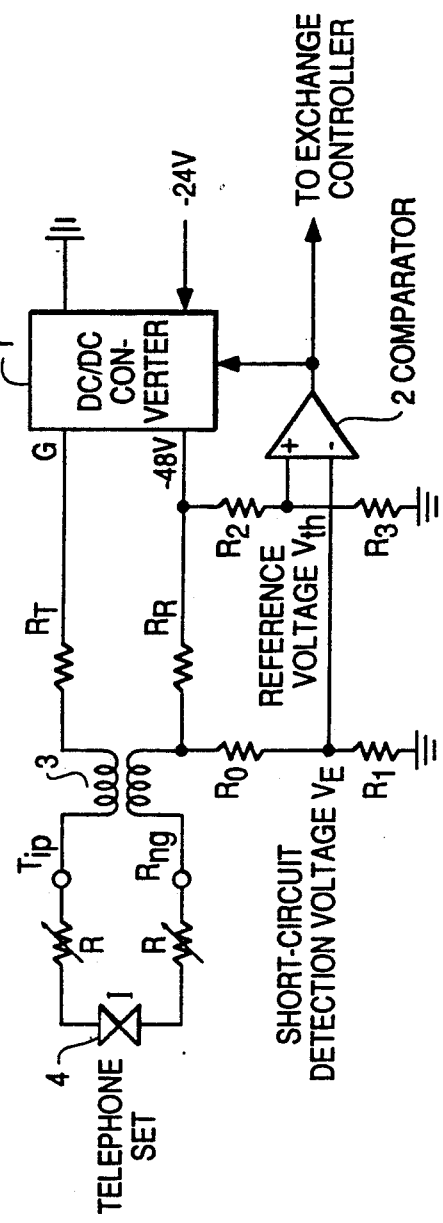
FIG. 2 is a block diagram showing a basic structure of the present invention.

In FIG. 2, the reference numeral 1 designates a DC/DC converter; 2, a comparator; 3, a battery feed transformer; 4, a subscriber telephone set. The reference voltage $V_{th}$ of the comparator 2 is generated by dividing an output voltage of −48V of the DC/DC converter 1 with resistors $R_2$ and $R_3$, supplied to the positive terminal of the comparator 2. The ground fault detection voltage $V_E$ is obtained by dividing the output voltage of $-48V$ of the DC/DC converter 1 with the battery feed resistor $R_R$ and dividing resistors $R_O$ and $R_1$ and is then supplied to the negative terminal of the comparator 2. If a ground fault is generated on the Tip line or Ring line of the subscriber lines, the ground potential is generated across the resistor $R_R$ and dividing resistor $R_O$ and appears also at the negative terminal of the comparator 2. Thereby, the comparator 2 is inverted, sending the ground fault supervisory signal to the exchange controller.

Figure 3:
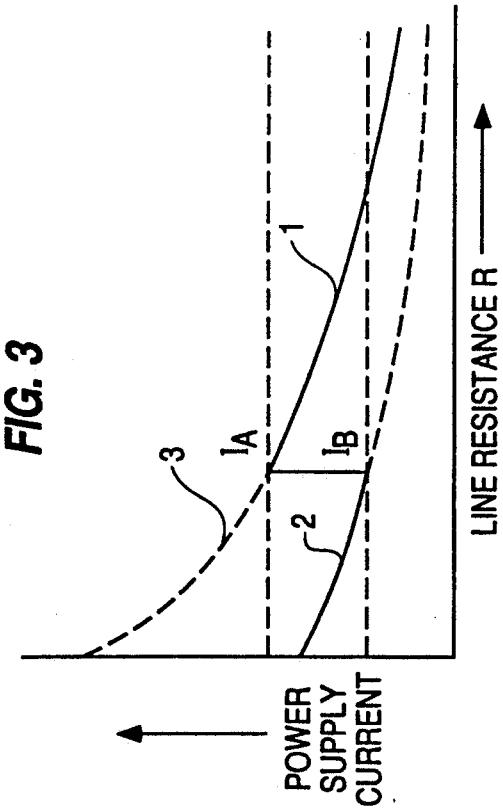
FIG. 3 is a line resistance/battery feed current characteristics of the present invention.

As an example, FIG. 3 shows a characteristic curve of a line resistance R of the subscriber lines connected to a subscriber telephone set 4 and a power supply current I.

In FIG. 3, the solid line curve indicated by 2 and 1 shows the characteristic of this circuit, while a line consisting of the dotted line 3 and solid line 1 indicates the conventional characteristic.

First, if a ground fault is generated, the line resistance becomes 0 and a power supply current I is doubled because the line resistance R is connected to the ground potential. Accordingly, in case a voltage of DC/DC converter 1 is $-48V$, a power supply current increases as indicated by the dotted line 3. Therefore, if a ground fault is generated, a battery feed current for the line resistance of zero is reduced to a half as indicated by a solid line 2 by setting the voltage of DC/DC converter to $-24V$.

The present invention employs this principle in which the voltage of $-48V$ is usually applied to the long distance subscriber lines having a large line resistance but if a ground fault is generated, an output voltage of DC/DC converter is changed to $-24V$ from $-48V$ through inversion of the comparator 2. Even when a ground fault is generated, since the power supply voltage is $-24V$, a required battery feed current may be a half of that for the voltage of $-48V$. Moreover, since the ground fault supervisory voltage $V_E$ and the reference voltage $V_{th}$ to be sent to the comparator may also be reduced to a half, the detecting circuit does not change for the comparator 2 and the supervisory signal for the exchange controller maintains the condition while it is transmitted. Therefore the comparator 2 is capable of holding a detection circuit of abnormal voltage only by resetting the power supply voltage of DC/DC converter to $-24V$ from $-48V$ and serves for the long distance subscribers without using elements which are resistive to a particular electrical power.

In FIG. 3, when a threshold current for $-48V$ during operation of the DC/DC converter, namely a battery feed current flowing when the comparator is inverted is defined as $I_A$, while a threshold current for $-24V$ flowing when the DC/DC converter stops as $I_B$, $I_A$ is equal to about 2 times of $I_B$. In case the power supply voltage is $-48V$, a battery feed current increases as the line resistance becomes smaller. When the battery feed current reaches the threshold value $I_A$, the comparator 2 is inverted providing a voltage of $-24$. When the power supply voltage becomes $-24V$, a battery feed current becomes smaller as the line resistance increases. When the battery feed current becomes lower than the threshold value $I_B$, the comparator 2 returns to the initial condition, providing a voltage of $-48V$. Accordingly, the power supply voltage can be adjusted depending on the value of line resistance.

Next, a preferred embodiment of the present invention will be explained.

Figure 4:
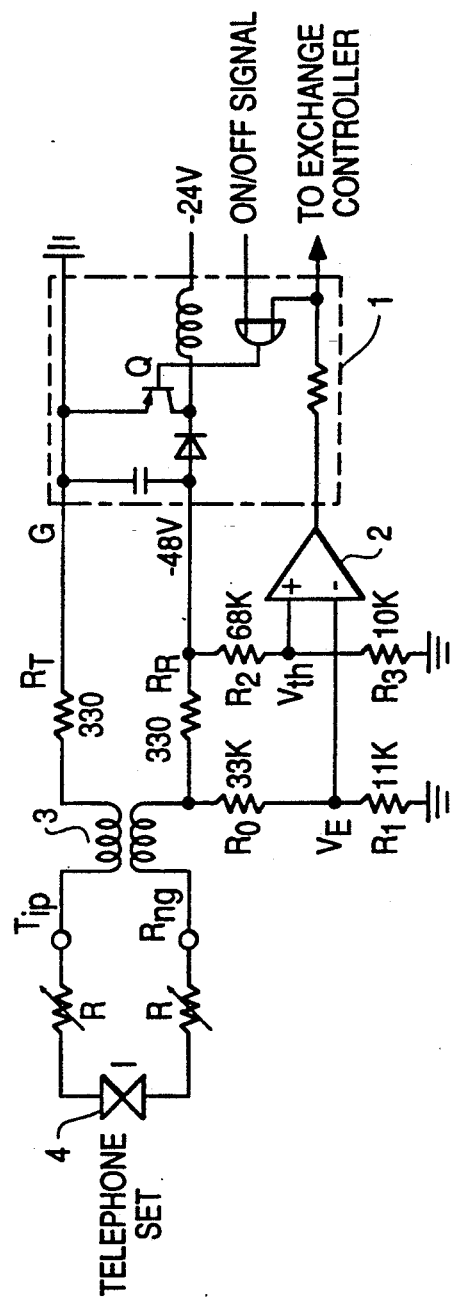
FIG. 4 shows an embodiment of the present invention.

FIG. 4 is a structure of a ground fault detector of the present invention. In FIG. 4, the reference numeral 1 designates a DC/DC converter; 2, a comparator; 3, a power supply transformer; 4, a subscriber telephone set.

When the battery feed resistors $R_T$ and $R_R$ are respectively $330\Omega$; dividing resistors for ground fault circuit $R_0$, $R_1$ are 33 k$\Omega$, 11 k$\Omega$; reference voltage dividing resistors $R_2$, $R_3$ are 68 k$\Omega$, 10 k$\Omega$, the reference voltage $V_{th}$ is 6V for battery feed voltage of $-48V$ and 3V for power supply voltage of $-24V$. Therefore, when a line resistance is large, a ground fault detection voltage $V_E$ is 12V and the comparator 2 is not inverted When the line resistance becomes smaller, the ground fault detection voltage $V_E$ also becomes smaller. When a ground fault is generated, the ground fault detection voltage $V_E$ becomes the ground potential, the comparator 2 is inverted, the signal "1" is sent to the exchange controller, issuing an alarm and mask controlling the ON/OFF signal for the switching transistor Q of the DC/DC converter 1. The DC/DC converter 1 comprises a switching element Q, an ON/OFF signal receiving part for controlling such switching element Q, a coil for boosting a voltage and a capacitor and a diode to form a rectifier circuit. The converter of this type is generally called a non-insulation type DC/DC converter. When the ON/OFF signal is applied to the gate of switching element Q, a DC voltage of $-24V$ is converted to an output voltage of $-48V$ by the switching operation with a duty ratio of 50%. On the other hand, when the ground fault generation supervisory signal "1" appears from the comparator 2, the ON/OFF signal is mask-controlled by the gate element and the control signal for the switching element Q is no longer transmitted. As a result, the switching element Q turns OFF.

Therefore, a diode and a coil are connected in series as a structure, an output thereof becomes $-24V$ and this voltage ($-24V$) is supplied to the battery feed circuit. Accordingly, the reference voltage $V_{th}$ of the comparator 2 becomes 3V but the comparator 2 is kept inverted since the voltage $V_E$ for detecting ground fault, maintaining the operating condition of the exchange controller. Since the voltage of $-24V$ is supplied to the battery feed circuit, if a current flows to the battery feed resistor $R_R$ due to the ground fault, it is only about 60 mA and thereby the alarm condition may be maintained.

According to the present invention, in the case of supplying the voltage of $-48V$ to the battery feed circuit of the long distance subscriber lines using a DC/DC converter, the ground fault detecting condition may be maintained by switching the voltage of $-48V$ to $-24V$ during detection of ground fault. As a result, reduction in size, light weight and economization of circuit elements can be realized by lowering a current capacity during occurrence of ground fault.

The present invention is suitable for designing a long distance subscriber lines.

What is claimed is:

1. In a ground fault detector for long distance subscriber lines accommodated in a digital electronic exchange, including a battery and an exchange controller, said ground fault detector comprises:

a DC/DC converter for selectively converting a low voltage to one of a high voltage and a lower voltage, to be applied to the subscriber line as a battery feed voltage in response to a DC/DC converter stop signal; and comparator means for detecting a ground fault by comparing a reference voltage obtained by dividing the battery feed voltage with a voltage obtained by dividing a ground fault detect voltage and for sending a ground fault supervisory signal to the exchange controller, said comparator means includes means for generating the DC/DC converter stop signal based on said comparing.

2. A ground fault detector according to claim 1, wherein said low voltage comprises −24V and converts an output voltage, said high voltage comprises −48V and said lower voltage comprises −24V.

3. A ground fault detector according to claim 1, wherein said DC/DC converter means includes means for converting the high voltage to said lower voltage upon reception of said DC/DC converter stop signal.

4. A ground fault detector according to claim 1, wherein said DC/DC converter comprises:

a switching element (Q),
an ON/OFF signal receiver for controlling said switching element,
a coil for boosting a voltage, nd
a capacitor and a diode connected to from a rectifying circuit.

5. A ground fault detector according to claim 4, wherein said DC/DC converter comprises:

a circuit structure connected to control passage of said ON/OFF signal to the switching element (Q), upon reception of said DC/DC converter stop signal.

6. A ground fault detector according to claim 1, further comprising:

a battery feed circuit for supplying a voltage to the long distance subscriber lines that comprises battery feed resistors and a battery feed transformer.

* * * * *